United States Patent Office 3,519,440
Patented July 7, 1970

3,519,440
AEROSOL TOPPINGS
Joachim W. Staackmann, Tinley Park, and Arlen R. Campbell, Danville, Ill., assignors to CPC International Inc., New York, N.Y., a corporation of Delaware
No Drawing. Filed June 12, 1967, Ser. No. 645,486
Int. Cl. B65b 31/00
U.S. Cl. 99—189                    14 Claims

ABSTRACT OF THE DISCLOSURE

Aerosol whipped toppings for ice cream and other desserts having a solids content of 60–70% existing in an aqueous emulsion form, which composition includes in carefully proportioned amounts, sugar, fat, non-fat milk solids, water and a unique emulsifying system promoting adequate over-run when expelled from the pressurized container. Composition is also stable and resistant to microbial attack under storage conditions at room temperature.

---

There is an ever increasing consumer demand for toppings which can be dispensed from aerosol units. There is a specified need for topping compositions which will remain stable and immune to microbial attack, even when stored over a considerable length of time at room temperature while contained in the pressurized unit.

Topping compositions currently on the market have one or more deficiencies when marketed in aerosol units. Their shelf life even under refrigeration is relatively short due to their support of bacterial growth. Storage at ambient temperature results in even more rapid deterioration. In order to store the aerosol toppings for any length of time they must be either held in a frozen state or aseptically packed. In the latter situation generally special valves must be utilized. Both of these solutions to the problem introduce increased cost, and, as well, do not have full consumer acceptance due to the inconvenience involved.

In addition, prior art toppings in some instances do not have capability of developing a desirable heavy body at room temperature. Stiffening only occurs upon loss of taste and flavor. Also, in some instances, prior art topping compositions do not possess adequate foam stability, i.e., the foam collapses too readily after is it dispensed and it exhibits excessive syneresis. In some instances, to overcome one or more of the above deficiencies, toppings have been formulated with a high fat content. This in turn led to a high greasy mouth feel.

It would be a considerable advance in the art if an aerosol whipped topping were provided which is resistant to microbial attack even under long periods of storage at room temperature, is able to withstand changes in storage temperature conditions without undergoing undesirable changes in texture and consistency, has excellent flavor and flavor stability, and can be readily prepared and distributed at reasonable cost. In particular, if the topping not only had good room stability, but also adequate over-run throughout the entire use of the dispensing unit, the aerosol topping would be readily accepted at the market place. For example, if the over-run could be maintained at about 250%, that is, the volume of foam to dispensed liquid was about 3.5:1 over the useful life of the unit, the improved topping product would be immeasurably attractive to the ultimate consumer.

In view of the above, it therefore becomes an object of the invention to provide an aerosol topping which demonstrates excellent storage stability and resistance to microbiological attack over a considerable duration of time.

Another object of the invention is to provide a topping composition useful in aerosol distribution techniques which maintains an adequate over-run throughout the useful life of the dispensing unit.

Still another object of the invention is to provide a non-refrigerated aerated topping which is relatively low in fat content, yet still has the desired creamy-mouth feel but without a high greasy mouth feel.

In still another object of the invention, a topping composition is carefully formulated to yield a material which has a sustaining pleasing taste, but yet has relatively long storage life at room temperature, and can be dispersed from an aerosol container to provide toppings of adequate foam stability and volume.

Other objects will appear hereinafter.

In accordance with the invention a unique edible topping composition has been discovered. This composition is specially formulated to be stably confined under pressure in an aerosol dispensing container, and can be easily dispensed from the pressurized container to provide a suitable aerosol whipped topping. The primary unique properties of this topping composition are stability to microbial attack without resort to refrigeration when contained in the aerosol dispensing unit, its ability to produce adequate over-run when dispensed, and consistent maintenance of the over-run substantially throughout the use of the can or dispensing container.

More specifically, the compositions of the invention are emulsions having a solids content of about 60% to about 70% and are composed of the following ingredients in carefully controlled proportions.

TABLE I

| Ingredient No. | Ingredient | Percent by weight |
|---|---|---|
| 1 | Sugar | 40–60 |
| 2 | Fat | 5–12 |
| 3 | Non-fat milk solids | 0.5–6.0 |
| 4 | Emulsifier: | |
|  | (a) Fatty acid glyceride | 0.4–1.1 |
|  | (b) Propylene glycol fatty acid ester | 0.3–1.0 |
| 5 | Water | 30–40 |

With specific regard to the ingredients listed above, any edible sugar may be employed such as sucrose, dextrose, levulose, corn sugar, corn syrup, corn syrup solids, invert sugar or the like or any mixture or combination of these. Preferred among these are sucrose, dextrose and corn syrup. The sugar component should be present in the amounts set forth above to impart proper sweetness and concomitantly help maintain proper solids content.

The fat in the above product should be present in an amount sufficient to impart the desired creamy mouth feel without being excessive to the point of demonstrating a greasy mouth feel to the product. In the compositions of the instant invention it has been discovered that the fat content should not be greater than say abou 12.0%. Above this figure the undesired greasy mouth feel begins to come into play. The most preferred proportion of fat is 5–12% of the total composition weight. The fat itself may be chosen from a wide variety of known materials such as partially and completely hydrogenated soy bean oil, cotton seed oil, coconut oil, and blends thereof. Hydrogenated coconut oil appears most suitable here.

The relatively low fat content in the composition is one factor allowing it to be stably stored under non-refrigerated conditions. Compositions higher in fat content not only have an undesirable greasy mouth feel, but also are materially more susceptible to spoilage through microbiological attack, particularly of the bacterial type.

The non-fat milk solids content again must be carefully formulated in the proper proportions to aid in propagating one or more objects of the invention. One primary object of presence of the non-fat milk solids in the stated proportions is to aid in stabilizing the foam after expelling the topping composition from the aerosol container. The non-fat milk solid may be chosen from a variety of known materials of this type including whey, casein and comparable materials within this class.

The emulsifier system employed in making up the instant compositions is believed to be of critical importance, both with respect to the type of ingredients making up the total emulsifier and proportions of these. It has been discovered that a special blend of emulsifiers must be employed to derive full effect of benefits described hereinafter. Specifically, the topping compositions should be composed of about 0.4% to 1.1% of a fatty acid glyceride and about 0.3% to 1.0% of a propylene glycol fatty acid ester.

In the first place the blend of emulsifiers described above co-acts to produce a weak or semi-emulsion. While this emulsion does break down somewhat in the aerosol container into aqueous and hydrophobic phases, light shaking of the can just prior to use easily restores the emulsion, allowing a homogeneous foam to be expelled. Surprisingly enough when a complete or stable emulsion was produced with other emulsifiers or combinations of emulsifiers, or the emulsifiers of the invention employed in amounts outside the ranges just stated, the topping composition when expelled from the aerosol unit did not provide sufficient over-run. That is, the volume of foam produced proportional to liquid present in emulsified form was low. In many cases the over-run was less than 100% compared to an over-run of 250% utilizing the emulsifying system of the invention. In essence, then, when a complete emulsion was produced, such emulsion when expelled from the can actually resulted in an aerated liquid and not a true foam.

Also, the proportions of ingredients making up the emulsifying system of the invention are likewise important. For example, if an excessive amount of propylene glycol fatty acid ester over that stated above is employed relative to the glycerides, there is noted a lessening in the over-run as one gradually dispenses more of the emulsion from the container. Thus, near the end of the usable life of the aerosol unit, the over-run is far below that desired. On the other hand, if one properly prepares an emulsifying system as outlined above, the over-run holds substantially constant over the entire dispensing. Again, experimentation proved that use of the glycerides alone, omitting the propylene glycol fatty acid ester, resulted in both a weak foam and a low over-run. Thus, it can readily be seen that the type and amount of emulsifiers present are extremely important in practice of the instant invention.

The just described glycerides and propylene glycol esters are derived, of course, from various fatty acids used as esterifying agents of the alcoholic materials. These fatty acid agents may be saturated or unsaturated. Unsaturated fatty acids used as esterifying agents include lauroleic, oleic, palmitoleic, myristoleic, linoleic, linolenic, and the like. The fatty acids used as esterifying agents may also be chosen from naturally-occurring sources in which a mixture of saturated and unsaturated fatty acids varying in their carbon content may be involved. For example, tallow, hydrogenated tallow, castor oil, palm oil, coconut oil, cotton seed oil, and the like may be employed as sources of esterifying agents. These natural sources vary widely as to their number and type of fatty acid constituents which go to make up the mixture. In practice of the instant invention, it has been found that stearic acid is the most preferred esterifying agent. Thus, to achieve optimum results with respect to satisfactory emulsification, as outlined above a mixture of mono and diglyceryl stearates and propylene glycol monostearate is employed in the invention.

It should be realized that various other well-known emulsifying agents may be added to the basic emulsifying compositions of this invention for their recognized and additive effect, and it is understood that such compositions are within the scope of the present invention.

In a greatly preferred embodiment, crystalline cellulose is also combined with the just-described ingredients. This material has the dual role of maintaining a consistent over-run throughout the life of the aerosol container and additionally aids in maintaining foam stability after the topping composition is expelled from the aerosol unit. Crystalline cellulose is a cellulosic material which has been hydrolysed to remove amorphous cellulosic fractions. Although the hydrolysis may be effected by various specific methods, the most direct method free of secondary reactions lies in treatment of the cellulosic material with hydrochloric acid. The cellulose resulting from the hydrolysis action of the acid on the cellulosic material reaches with time a substantially constant molecular weight. Preferred cellulose crystallites have a high degree of perfection as characterized by their X-ray defraction and a high level of chemical purity. One material of this type used in the instant invention is trademarked as Avicel. When utilized, the microcrystalline cellulose is generally present in an amount ranging from about 0.75% to about 1.25% by weight.

Additional ingredients may also be employed in preferred compositions and they include small amounts of carbohydrate materials such as gums and starches which have a bodying and water binding effect. Carboxymethyl cellulose, starches such as rice, potato, corn, tapioca, etc. significantly improved the ability of the emulsion to withstand freezing and thawing without adverse effects, and aid in stabilizing expelled foam. Additional stabilizers may also be present such as algin, sodium alginate, egg albumen, soya albumen, hydrated gelatin, or refined hydrocolloids obtained from sea plants, mainly Irish moss or carrageen. The most preferred ingredient of this type is algin gum which is generally utilized in an amount ranging from about 0.1% to about 0.4% by weight. Various other materials than those set out above may also be present in the topping compositions described herein such as vitamins, minerals, flavoring agents, dyes, colorants, etc. For example, a number of different aerated toppings may be prepared utilizing such flavorants as chocolate liquor, cocoa, strawberry, vanilla, etc. In addition, the aerated compositions may contain such ingredients as lecithin or hydroxy lecithin, citric acid, fumaric acid, and other flavoring agents than those just mentioned such as caramel, mint, butter, maple, spice, and the like.

In order to form a typical topping composition the various ingredients are first homogenized to form an aqueous emulsion. After heat processing at elevated temperatures, the emulsion is packed in an aerosol can. This can is pressurized with a propellant comprising a suitable gas or mixtures of gases, e.g., nitrous oxide with some carbon dioxide, monochloropentafluoroethane, isobutane, propane, octafluorocyclobutane, etc. One preferred mode of forming the emulsion is to add water to the algin gum, when present, to hydrate it, add the rest of the ingredients and then pressure homogenize.

It is believed that the solids content of the compositions described herein is an important factor in preventing spoilage of the materials by microbiological attack. It is thought that due to the relatively high solids content an osmotic pressure is set up which is greater than the external pressure of the organisms causing product degradation. Due to this effect, moisture is driven from the cell of the organism which is thus destroyed by dehydration. This important facet of the invention is not, of course, the only reason for the composition's resistance to attack, but is believed to be one primary cause leading to excellent product stability.

The following are examples of typical formulations of the invention. In each instance these materials had excellent storage stability characteristics at room temperature. Specifically, even after two or three months of storage time at ambient temperature, no product breakdown or spoilage was noted in any of the test samples.

COMPOSITION A—MILK CHOCOLATE AERATED TOPPING

| Ingredients: | Wt. percent |
|---|---|
| Sucrose | 43.000 |
| Water | 34.842 |
| Non-fat milk powder | 5.000 |
| Hydrogenated coconut oil | 8.000 |
| 50–50 mixture of propylene glycol monostearate and distilled monoglycerides | 1.400 |
| Mixture of mono and diglycerides | 0.100 |
| Algin | 0.250 |
| Microcrystalline cellulose (92% pure) | 1.000 |
| Chocolate liquor | 3.000 |
| Cocoa | 3.000 |
| Vanilla | 0.340 |
| Brown coloring | 0.063 |
| Blue coloring | 0.005 |
| | 100.000 |

COMPOSITION B—CHOCOLATE FUDGE AERATED TOPPING

| Ingredients: | Wt. percent |
|---|---|
| Sucrose | 35.000 |
| Water | 32.785 |
| Corn syrup | 12.180 |
| Hydrogenated coconut oil | 7.500 |
| Whey powder | 1.000 |
| Microcrystalline cellulose (92% pure) | 1.000 |
| 50–50 mixture of propylene glycol monostearate and distilled monoglycerides | 1.400 |
| Mixture of mono and diglycerides | 0.100 |
| Algin | 0.250 |
| Chocolate liquor | 4.000 |
| Cocoa | 4.000 |
| Vanilla | 0.340 |
| Yellow coloring | 0.170 |
| Red coloring | 0.170 |
| Blue coloring | 0.075 |
| Yellow coloring | 0.030 |
| | 100.000 |

COMPOSITION C—MARSHMALLOW AERATED TOPPING

| Ingredients: | Wt. percent |
|---|---|
| Sucrose | 22.83 |
| Water | 31.67 |
| Corn syrup | 20.25 |
| Dextrose | 11.00 |
| Hydrogenated coconut oil | 10.00 |
| Whey powder | 1.00 |
| Microcrystalline cellulose (92% pure) | 1.00 |
| 50–50 mixture of propylene glycol monostearate and distilled monoglycerides | 1.40 |
| Mixture of mono and diglycerides | 0.10 |
| Algin | 0.25 |
| Vanilla | 0.50 |
| | 100.00 |

COMPOSITION D—STRAWBERRY AERATED TOPPING

| Ingredients: | Wt. percent |
|---|---|
| Sucrose | 22.830 |
| Water | 31.815 |
| Corn syrup | 20.250 |
| Dextrose | 11.000 |
| Hydrogenated coconut oil | 10.000 |
| Whey powder | 1.000 |
| Microcrystalline cellulose (92% pure) | 1.000 |
| 50–50 mixture of propylene glycol monostearate and distilled monoglycerides | 1.400 |
| Mixture of mono and diglycerides | 0.100 |
| Algin | 0.250 |
| Strawberry flavoring | 0.350 |
| Red coloring | 0.005 |
| | 100.000 |

In addition to excellent storage stability at room temperature the above aerated toppings also demonstrated superior over-run that was consistent throughout the entire period of expulsion from the container, until the contents were exhausted. The proper amount of foam was produced whether the propellant used was a mixture of octafluorocyclobutane and nitrous oxide or nitrous oxide alone. The volume increase was approximately 250% in each case, and this amount of over-run was maintained substantially constant throughout the useful life of the aerosol can.

Besides demonstrating proper over-run and storage stability, the compositions of the invention developed the desirable heavy body at room temperature and stiffened without loss of taste or flavor. Due to their heavy body, the individual froth bubbles did not tend to break but held their shape, thus assurring that the topping remained expanded for the proper period of time. Also, even when subjected to relative extreme changes in storage temperature it was noted that the compositions did not undergo an undesirable change in texture and consistency. The creamy aerosol whipped topping had excellent texture and prolonged flavor and could undergo a number of freeze-thaw cycles without adverse effects.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. An edible topping composition confined under pressure in an aerosol dispensing container comprising the following ingredients having a total solids content of 60–70% by weight,

| Ingredient: | Wt. percent |
|---|---|
| (1) Sugar | 40–60 |
| (2) Fat | 5–12 |
| (3) Non-fat milk solids | 0.5–6.0 |
| (4) Emulsifier: | |
| (a) Fatty acid mono and diglyceride | 0.4–1.1 |
| (b) Propylene glycol fatty ester | 0.3–1.0 |
| (5) Water | 30–40 | said composition being capable of being dispensed from the pressurized container to provide an aerosol whipped topping, and being further characterized as stable to microbial attack without resort to refrigeration when so pressurized.

2. An edible topping composition confined under pressure in an aerosol dispensing container comprising the following ingredients having a total solids content of 60–70% by weight,

| Ingredient: | Wt. percent |
|---|---|
| (1) Sugar | 40–60 |
| (2) Fat | 5–12 |
| (3) Non-fat milk solids | 0.5–6.0 |
| (4) Emulsifier: | |
| (a) Fatty acid mono and diglyceride | 0.4–1.1 |
| (b) Propylene glycol fatty ester | 0.3–1.0 |
| (5) Microcrystalline cellulose | 0.75–1.25 |
| (6) Water | 30–40 | said composition being capable of being dispensed from the pressurized container to provide an aerosol whipped topping, and being further characterized as stable to microbial attack without resort to refrigeration when so pressurized.

3. An edible topping composition confined under pressure in an aerosol dispensing container comprising the following ingredients hving a total solids content of 60–70% by weight,

| Ingredient: | Wt. percent |
| --- | --- |
| (1) Sugar | 40–60 |
| (2) Fat | 5–12 |
| (3) Non-fat milk solids | 0.5–6.0 |
| (4) Emulsifier: | |
| (a) Fatty acid mono and diglyceride | 0.4–1.1 |
| (b) Propylene glycol fatty ester | 0.3–1.0 |
| (5) Microcrystalline cellulose | 0.75–1.25 |
| (6) Vegetable gum | 0.1–0.4 |
| (7) Water | 30–40 | said composition being capable of being dispensed from the pressurized container to provide an aerosol whipped topping, and being further characterized as stable to microbial attack without resort to refrigeration when so pressurized.

4. An edible topping composition confined under pressure in an aerosol dispensing container comprising the following ingredients having a total solids content of 60–70% by weight,

| Ingredient: | Wt. percent |
| --- | --- |
| (1) Sugar | 40–60 |
| (2) Fat | 5–12 |
| (3) Non-fat milk solids | 0.5–6.0 |
| (4) Emulsifier: | |
| (a) Mixture of fatty acid mono and and diglycerides | 0.4–1.1 |
| (b) Mono fatty acid ester of propylene glycol | 0.3–1.0 |
| (5) Water | 30–40 | said composition being capable of being dispensed from the pressurized container to provide an aerosol whipped topping, and being further characterized as stable to microbial attack without resort to refrigeration when so pressurized.

5. An edible topping composition confined under pressure in an aerosol dispensing container comprising the following ingredients having a total solids content of 60–70% by weight,

| Ingredient: | Wt. percent |
| --- | --- |
| (1) Sugar | 40–60 |
| (2) Fat | 5–12 |
| (3) Non-fat milk solids | 0.5–6.0 |
| (4) Emulsifier: | |
| (a) Mixed mono and diglyceryl stearate | 0.4–1.1 |
| (b) Propylene glycol monostearate | 0.3–1.0 |
| (5) Water | 30–40 | said composition being capable of being dispensed from the pressurized container to provide an aerosol whipped topping, and being further characterized as stable to microbial attack without resort to refrigeration when so pressurized.

6. The composition of claim 3 wherein said vegetable gum is derived from sodium algin.

7. The composition of claim 1 wherein said sugar is sucrose.

8. The composition of claim 1 wherein said sugar is a mixture of corn syrup and sucrose.

9. The composition of claim 1 wherein said sugar is a mixture of sucrose, corn syrup and dextrose.

10. The composition of claim 1 wherein said fat is a hydrogenated coconut oil.

11. The composition of claim 1 wherein said non-fat milk solids is whey.

12. The composition of claim 1 which additionally contains a chocolate flavoring agent selected from the group consisting of cocoa and chocolate liquor.

13. The composition of claim 1 which additionally contains a vanilla flavoring agent.

14. The composition of claim 1 which additionally contains a strawberry flavoring agent.

References Cited

UNITED STATES PATENTS

| 2,883,286 | 4/1959 | Musser | 99—139 |
| 3,199,988 | 8/1965 | Kozlik et al. | 99—139 |
| 3,366,494 | 1/1968 | Bower | 99—189 |

MAURICE W. GREENSTEIN, Primary Examiner

J. M. HUNTER, Assistant Examiner

U.S. Cl. X.R.

99—139